United States Patent [19]
Doremus

[11] Patent Number: 5,398,796
[45] Date of Patent: Mar. 21, 1995

[54] DECLUTCHING DEVICE HAVING AN HYDRAULIC ACTUATOR FOR SNAP-FITTING ON A CLUTCH OF THE PULL-OFF TYPE

[75] Inventor: Olivier Doremus, Noyelle Vion, France

[73] Assignee: Valeo, Paris, Cedex, France

[21] Appl. No.: 187,894

[22] Filed: Jan. 28, 1994

[30] Foreign Application Priority Data

Jan. 29, 1993 [FR] France .................. 93 00936

[51] Int. Cl.⁶ .................. F16D 13/22; F16D 25/08
[52] U.S. Cl. .................. 192/85 CA; 192/98; 192/110 B
[58] Field of Search .................. 192/85 CA, 85 C, 98, 192/89.24, 110 B, 101

[56] References Cited

U.S. PATENT DOCUMENTS 4,399,898  8/1983  Olschewski et al. ...... 192/85 CA X
4,632,237 12/1986  Maycock et al. .............. 192/101 X
4,778,039 10/1988  Eliasson ...................... 192/85 CA

FOREIGN PATENT DOCUMENTS 2304826 10/1976  France .
2651846  3/1991  France .
2088010  6/1982  United Kingdom .
2109888  6/1983  United Kingdom .
2157790 10/1985  United Kingdom .
9004116  4/1990  WIPO .

Primary Examiner—Andrea L. Pitts
Attorney, Agent, or Firm—Longacre & White

[57] ABSTRACT

A declutching device for a clutch of the pull-off type, especially for a motor vehicle, comprises an hydraulic actuator, a preloading coil spring which permanently biasses the movable member of the hydraulic actuator towards its retracted position into the fixed member of the actuator with which the movable member is in piston and cylinder relationship, and a retaining element for holding the movable member in its extended position with respect to the fixed member until the declutching device has been properly snap-fitted on to the clutch. The preloading spring is indexed angularly on the fixed member and on the movable member, and the retaining element comprise a lug, which is fixed to one of the two actuator members and engages with an angle element fixed to the other actuator element, so as to provide axial and circumferential abutment between the two actuator members in a predetermined relative angular position of these latter, and such as to put the spring into torsional prestress.

4 Claims, 1 Drawing Sheet

DECLUTCHING DEVICE HAVING AN HYDRAULIC ACTUATOR FOR SNAP-FITTING ON A CLUTCH OF THE PULL-OFF TYPE

FIELD OF THE INVENTION

This invention relates in general terms to the assembly of a declutching device on to a clutch of the pull-off type when the said declutching device employs an hydraulic actuator, that is to say when it comprises two members, namely a fixed member and a movable member in piston and cylinder relationship with each other for sliding movement of the movable member along a cylindrical interface surface of the fixed member, the two said members defining a control chamber between them, and with a clutch release bearing coupled to the movable member for acting in traction on the declutching means of the clutch.

More particularly, the invention is concerned with the case where, in terms of a clutch assembly for a motor vehicle, assembly of the declutching device to the clutch is carried out by snap-fitting while two units are moved axially towards each other, one of these units comprising the engine of the vehicle together with the clutch, while the other unit comprises the gearbox of the vehicle together with the declutching device. In this case, the clutch, or more precisely its declutching means (such as a diaphragm) is typically provided for this purpose with a thrust means for engagement with the clutch release bearing of the declutching device through an appropriate coupling member.

BACKGROUND OF THE INVENTION

The problem that arises in this connection is that, in order that the clutch release bearing may be brought into engagement with the above mentioned thrust means of the clutch during assembly, the movable member of the actuator which carries the clutch release bearing must be in a position in which it is extended or projecting from the fixed member of the actuator; but, in order for the clutch release bearing to be in permanent engagement against the said thrust means in service through the coupling member, preloading means are also provided for, by contrast, biassing the movable member of the actuator permanently towards its retracted position with respect to the fixed member.

Accordingly, during assembly, the movable member of the hydraulic actuator first has to be put into its extended position and retained in that position, from which it subsequently has to be released. In other words, it is necessary to provide retaining means which are adapted to retain the movable member in its extended position for so long as this is required.

In the specification of French published patent application FR 2 651 846A, the preloading means comprise a spring of the coil spring type, and the retaining means comprise a retractable abutment element which, under control, provides an engagement means for the movable member of the hydraulic actuator at the rear of the latter. In order that this retractable abutment element can be effaced so that the movable member of the hydraulic actuator can be released from its extended position, a specific additional action on the retractable abutment element is necessary, and this complicates the assembly operations.

Such a retractable abutment element also increases quite substantially the radial size of the whole assembly, and it is also relatively complicated and costly to manufacture. In addition, because the abutment element gives the movable member of the hydraulic actuator a rigid mechanical abutment point, it is liable to give rise to damage of either the fixed or the movable member of the actuator when in use, if the axial thrust exerted in order to achieve the required snap-fitting action is too great.

Finally, since in practice there is no check as to whether the required snap-fitting engagement has indeed been achieved, it is possible that the retractable abutment element can be accidentally effaced, even when the snap-fitting has for some reason or other not been effected. Once this error becomes apparent, the operations have to be started all over again, and the movable member of the hydraulic actuator has to be restored to its extended position.

However, it can happen that this fault may just as easily pass unnoticed, so that the clutch is then subsequently unable to be disengaged.

DISCUSSION OF THE INVENTION

An object of the invention is to provide a declutching device which overcomes the above drawbacks.

According to the invention, a declutching device for snap-fitting engagement on a clutch of the pull-off type, the declutching device being of the kind comprising an hydraulic actuator which itself comprises two members, one of which is fixed and the other movable, the said members being in piston and cylinder relationship with each other; preloading means comprising a spring of the coil spring type, for permanently biassing the said movable member of the hydraulic actuator towards its retracted position with respect to the said fixed member; and retaining means for retaining the said movable member in an extended position with respect to the said fixed member, is characterised in that the spring of the preloading means is indexed angularly at one of its ends on the fixed member of the hydraulic actuator, and at its other end on the movable member, and the retaining means comprise at least one lug which is fixed with respect to one of the said members of the actuator, and which is arranged to engage with an angle element which is fixed with respect to the other said member of the actuator, whereby the or each said lug and its associated said angle element cooperate to provide an axial and circumferential abutment between the said fixed and movable members of the actuator in a predetermined relative angular position of the said members, whereby to put the said spring into a torsionally prestressed state.

During assembly, the movable member of the hydraulic actuator is in its extended position, in which it is retained by the retaining means. After the primary and secondary units have been moved towards each other in relative axial displacement far enough for the required snap-fitting engagement normally to have taken place, a reverse relative axial movement is applied to the two units so as to tend to move them further apart. Then, if the required snap-fitting action has effectively been achieved, the declutching nose or actuating element of the declutching device, and with it the movable member of the hydraulic actuator, will then be coupled to the declutching means (such as a diaphragm) of the clutch.

The lug (or each lug) of the retaining means then escapes from its engagement with the associated angle element, and this releases the movable member of the actuator with respect to the fixed member of the latter, in both the circumferential and axial directions. The torsional prestress in the spring constituting the preloading means then causes the movable actuator member to rotate with respect to the fixed actuator member, so bringing the lug into a position in which it is no longer axially in line with the associated angle element. The retaining means are thus rendered ineffective, so that the movable actuator member is free to be displaced towards its retracted position once relative axial movement of the two units away from each other has been stopped.

Thus, in an arrangement according to the invention, the movable member of the hydraulic actuator is released, or unlocked, in a systematic way during assembly, without any additional operation having to be carried out for this purpose. In addition, this unlocking action has the advantage that it only takes the form of a sharp and positive movement, and once this has occurred the correct snap-fitting action has been achieved, thus, the invention has the advantage that it gives a positive check on the correct snap-fitting engagement of the declutching device with the clutch.

In this regard, the invention also provides a method of commissioning the declutching device according to the invention, in which, with the movable member of the hydraulic actuator being in its extended position, with the lug or lugs of the retaining means in engagement with the corresponding angle element or elements, the declutching device and clutch are brought together in relative axial movement, after which a relative axial movement in the reverse direction is applied momentarily so as to tend to move the declutching device and clutch away from each other again.

A further advantage of the declutching device in accordance with the invention is that it is re-usable after any disassembly of the declutching device, for example after removal of the clutch release bearing which is part of the device (for example for maintenance purposes).

The various features and advantages of the invention will appear more clearly on a reading of the detailed description of a preferred embodiment of the invention which follows, and which is given by way of example only and with reference to the accompanying diagrammatic drawings.

DESCRIPTION OF A PREFERRED EMBODIMENT OF THE INVENTION

Figure 1:
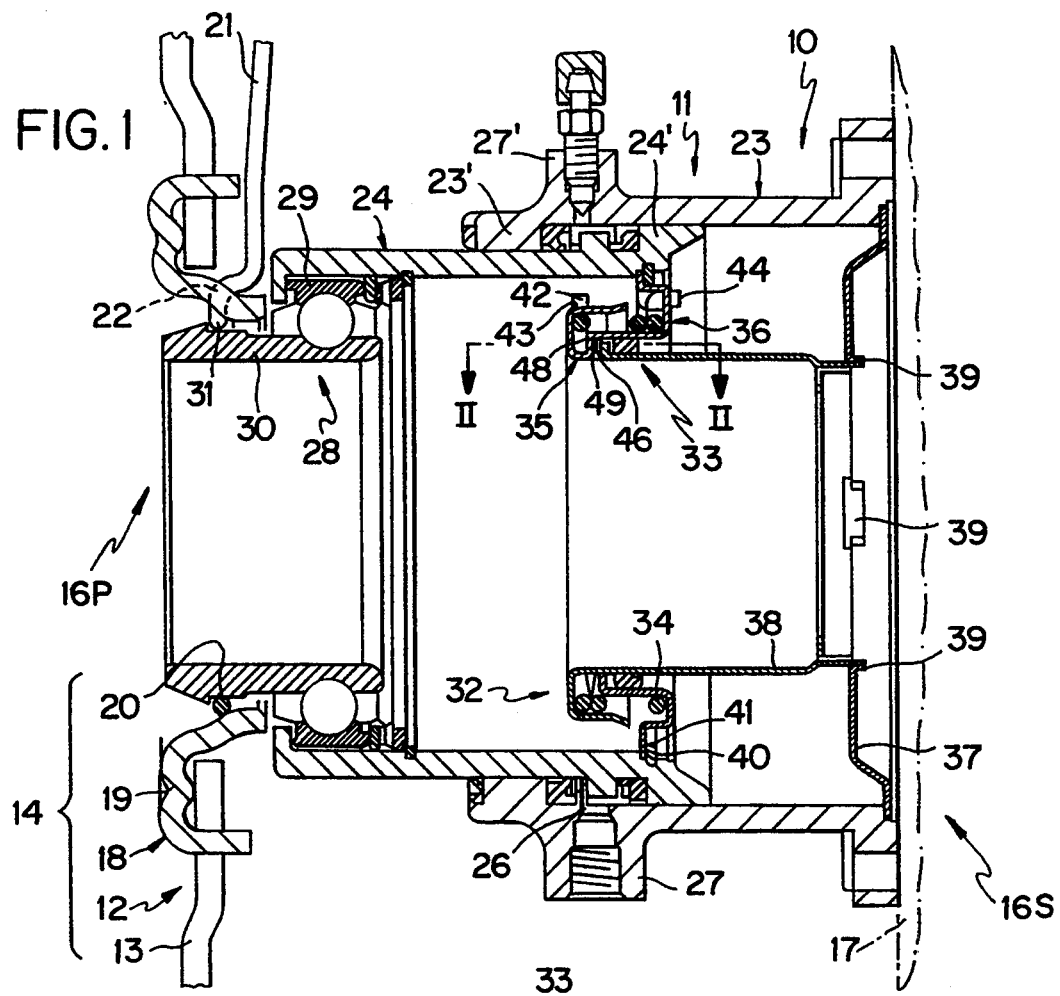
FIG. 1 is a view in axial cross section of a declutching device in accordance with the invention, with the movable member of its hydraulic actuator shown in the withdrawn or extended position with respect to the fixed member of the actuator.

As is shown in FIG. 1, a declutching device 10 is snap-fitted on a clutch 12 of the pull-off type. The purpose of the arrangement to be described is to facilitate this snap-fitting. The declutching device 10 has an hydraulic actuator 11. The clutch 12 has a declutching means 13, in this example a diaphragm, which, for the purposes of its engagement (through the said snap-fitting) with the declutching device 10, is provided with thrust means 14.

The clutch 12 is typically a motor vehicle clutch, and this description will be given in the context of a motor vehicle clutch, by way of example only. The engine of the vehicle, together with the clutch 12, constitute a first unit 16P, or primary unit. Similarly the gearbox of the vehicle, together with the declutching device 10, constitute a second unit 16S, or secondary unit. In this connection the declutching device 10 is secured on the casing 17 of the gearbox, for example by means of threaded fasteners not shown. Thus the snap-fitting connection mentioned above is made during assembly, that is to say while relative axial movement is being carried out to bring the two units 16P and 16S together.

In the present example the thrust means 14 of the clutch 12 includes, in a known manner, a thrust element 18 having a corrugated or beaded portion 19. The thrust element 18 bears through this beaded portion on the diaphragm 13, on the side of the latter opposite to the declutching device 10. The thrust means 14 also includes a coupling member 20, whereby the declutching device 10 is able to exert a tractive force on the thrust element 18. In the present case this coupling member 20 is in the form of a coupling ring which is discontinuous, having a slot, the ring being extended by generally radial arms 20 extending on either side of this slot. The coupling ring 20 is resiliently deformable radially, and bears on a generally frustoconical portion 22 of the thrust element 18, on the side of the latter opposite to the declutching device 10. For more detail as to such a thrust means 14, reference may for example be made to U.S. patent specification No. 5 113 989 and the corresponding French published patent specification FR 2 653 195A.

The hydraulic actuator 11 of the declutching device 10 in the present case comprises a fixed member 23 and a movable member 24 arranged in piston and cylinder relationship with each other, for sliding movement of the movable member 24 with respect to the fixed member 23. At its outer or left hand end (in FIG. 1) the fixed member 23 has an inwardly directed terminal radial flange 23'. Similarly, at its right hand end in FIG. 1, or inner end, within the fixed member 23, the movable member 24 has an outwardly directed radial flange 24'. These two radial flanges define between them a sealed control chamber 26.

For example, and as shown in the drawings, the fixed member 23 of the actuator 11 is radially outside the movable member 24, i.e. the latter moves as a piston within the fixed member 23. The radial flange 23' of the fixed member 23 is directed towards the axis of the control chamber 26, and the hydraulic actuator 11 is secured by means of the fixed member 23 to the casing 17 of the gearbox. To this end, the member 23 has at its rear end a radial fastening flange which can be seen in FIG. 1.

The fixed member 23 of the actuator includes at least one tubular boss 27, 27', in which at least one connecter is fitted for supplying hydraulic fluid to the control chamber 26. In this example, there are two of these tubular bosses 27 and 27', the boss 27 being a feed boss and the boss 27' a purge boss.

A clutch release bearing 28 is connected to the movable member 24 of the actuator. The clutch release bearing 28, which is adapted for the snap-fitting engagement already mentioned, comprises a ball bearing having an outer ring 29 which is located axially on the movable member 24, with automatic centring means of the axial spring type as can be seen in FIG. 1. The inner ring of this bearing is extended axially beyond the movable member 24 of the actuator, so as to define an actuating element 30 which has on its outer periphery a transverse shoulder 31, by means of which it is able to cooperate in a hooked relationship with the coupling member 20.

Finally, the declutching device 10 also includes preloading means 32 which permanently bias the movable member 24 of the hydraulic actuator 11 towards its retracted or withdrawn position with respect to the fixed member 23; and retaining means 33 which, as can be seen in FIG. 1, are adapted so as to be able to retain the movable member 24 in its extended position shown in FIG. 1.

The preloading means 32 in this example comprise a coil spring 34, which bears on the base of an annular cup 35 which is carried axially on the fixed member 23 of the actuator, and which bears on the base of a second annular ring 36 which is itself carried axially on the movable member 24. The first annular cup 36 is fixed to a mounting plate 37 which bears axially on the rear of the fixed member 23 of the hydraulic actuator 11, between the fixed member 23 and the casing 17 of the gearbox. In addition, the mounting plate 37 is located circumferentially on the fixed member 23, for example by a pin (not shown), or by crimping.

In the present example, the radially innermost side wall of the annular cup 35 is integral with the cylindrical sleeve 38 which is fitted into the mounting plate 37 by means of lugs 39.

The annular cup 36 bears in this example axially in one direction on a resilient split ring 40 which is fitted in a groove in the movable member 24, while it bears in the opposite axial direction on a transverse shoulder 41 of the movable member 24. The frictional effects occurring between the annular cup 36 and the movable member 24 of the actuator may be enough to locate it circumferentially on the latter. However, complementary locating means may if desired be provided, and these may for example comprise a pin (not shown), an adhesive fastening or crimping.

The spring 34 of the preloading means 32 is indexed angularly, at one of its ends, on the fixed member 23 of the hydraulic actuator 11, and is indexed angularly at its other end on the movable member 24 of the actuator.

Since the annular cups 35 and 36 are located circumferentially (that is to say they are indexed), the first cup 35 on the fixed member 23 and the second cup 36 on the movable member 24, it is through these cups 35 and 36 that the spring 34 is here indexed on the fixed member 23 and movable member 24. For example, and as seen in the drawings, that one of the endmost turns of the spring 34 by which the latter bears on the base of the annular cup 35 is extended at its end by a finger, by means of which it is in engagement with the annular cup 35. In this example the finger 42 extends radially away from the axis of the control chamber 26, and is engaged, for example without a clearance, in a groove 43 which is provided for this purpose in the corresponding side wall of the annular cup 35.

Similarly, that one of the endmost turns by which the spring 34 bears on the base of the annular cup 36 has in this example a finger 44 whereby the spring 34 is in engagement with the annular cup 36. In this example the finger 44 is directed axially away from the clutch 12, and is in engagement, for example without clearance, with a hole (which cannot be seen in the drawings), which is provided for this purpose in the base of the annular cup 36.

In a modification of the arrangements just described, the endmost turns of the spring 34 may equally well be incomplete turns abutting at their ends on the annular cups 35 and 36.

In addition, the retaining means 33 further include at least one lug 46 which is fixed to one of the members 23 and 24, and which is in engagement with an angle element 48 which is fixed to the other member 24 or 23, so as to provide an abutment in both the axial and circumferential directions for a relative angular position of the actuator members 23 and 24. This provides torsional prestressing of the spring 34.

As before, the (or each) lug 46 and angle element 48 are in this example in fixed relationship with the actuator elements 23 and 24 through the annular cups 35 and 36. In the present example, the lug 46 is integral with one of the annular cups 35, 36, while the angle element 48 is integral with the other of these elements 36 or 35. More precisely, the lug 46 is, as shown, integral with the annular cup 36 located on the movable member 24, while the angle element 48 is integral with the other annular cup 35 which is located on the fixed actuator member 23.

The lug 46 is part of a flange of the annular cup 36 which is directed radially towards the axis of the control chamber 26, and which, along its free edge, bounds the radially innermost side wall of the annular cup 36. This lug 46 is separated from the remainder of this flange by slots which are not visible in FIG. 1.

Figure 2:
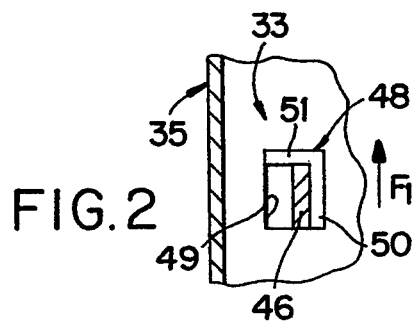
FIG. 2 is a partial view in cross section taken on the line II—II in FIG. 1.

The angle element 48 is formed in a slot 49 in the radially innermost side wall of the annular cup 35 from which it projects, and it is directed radially away from the axis of the control chamber 26. As is best seen in FIG. 2, the angle element 48 is in the form of a right angled dihedral having an arm 50 and an arm 51. The arm 50 extends transversely with respect to the axis of the control chamber 26, like the corresponding lug 46. The arm 51 extends parallel to that axis along a generatrix of the appropriate side wall of the annular cup 35.

In a modification of the arrangements described above, the lug 46 may of course extend away from the axis of the control chamber 26, being then constituted by a local bent-over portion of the corresponding flange of the annular cup 36, with the angle element 48 then extending towards this axis, and projecting from the radially outermost side wall of the annular cup 35.

The lug 46 of the retaining means 33 is brought into engagement with the angle element 48 with which it is associated, as shown in FIGS. 1 and 2, either by the manufacturer of the declutching device 10, or by the vehicle manufacturer during assembly (but preferably by the manufacturer of the declutching device). This necessitates, firstly, putting the movable member 24 of the hydraulic actuator 11 into its extended position shown in FIG. 1, and secondly, rotating the movable member 24 with respect to the fixed member 23 and about the axis of the control chamber 26, with the lug 46 acting on the axial arm 51 of the angle element 48. The displacement of the movable member 24 in its movement to its extended position will of course have been large enough to achieve this.

The spring 34 of the preloading means 32 is then under elastic prestress, both axially, with a pre-applied compressive stress as can be seen in FIG. 1, and circumferentially (that is to say angularly) with a pre-applied torsional stress as indicated diagrammatically by an arrow F1 in FIG. 2. This elastic prestressing results in the lug 46 of the retaining means 33 being in abutment, both axially and circumferentially, against the angle element 48 with which it is associated, its axial abutment being obtained through the arm 50 of the angle element 48, and its circumferential abutment through the arm 51 of the latter.

With the movable member 24 of the hydraulic actuator 11 thus in its extended position shown in FIG. 1, with the lug 46 of the retaining means 33 in engagement with the angle element 48 associated with it, the assembly of the declutching device to the clutch can now take place. Accordingly, the two units 16P and 16S are moved axially towards each other, until the actuating element 30 of the clutch release bearing 28 becomes engaged axially in the coupling member 22 of the clutch 12. The coupling member 20 deforms elastically in order to ride over the shoulder 31. During this relative axial movement, and provided of course that it involves a large enough displacement, the coupling member 20 becomes locked against the shoulder 31 of the actuating element 30 of the clutch release bearing 28, so as to give the required snap-fitting.

However, in the present example, and as shown in FIG. 1, the relative axial displacement is such that the coupling member 20 is not initially in actual contact with the shoulder 31, but is spaced axially beyond the latter by a small amount. Accordingly, a momentary relative axial displacement in the opposite direction is effected between the two units 16P and 16S so as to take up the clearance and bring the coupling member 20 into hard contact with the shoulder 31. This reverse displacement is carried out in order to ensure that if there is such a clearance, it will be taken up.

Figures 3A, 3B, 3C:
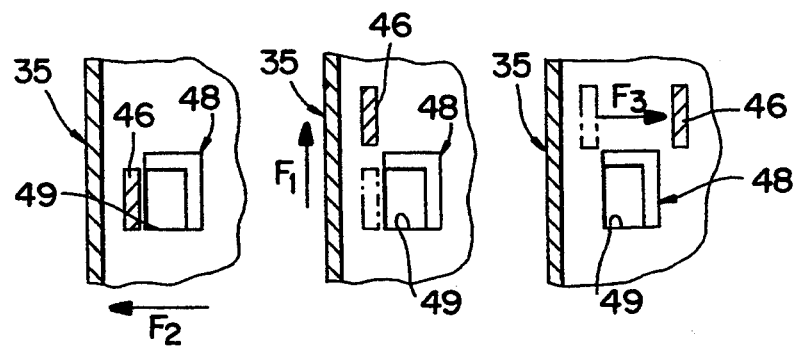
FIGS. 3A, 3B and 3C are scrap views in cross section similar to FIG. 2, showing three successive phases in the release of the movable member of the hydraulic actuator.

If this reverse axial movement between the two units 16P and 16S is now continued, the movable member 24 of the hydraulic actuator 11 will tend to move further out of the fixed member 23, and this results in disengagement of the lug 46 of the retaining means 33 from the angle element 48, as is indicated by the arrow F2 in FIG. 3A. FIG. 3A shows in phantom lines the initial position of the lug 46 at the beginning of the relative axial movement of the units 16P and 16S away from each other, while the position of the lug 46 at the end of this movement is shown in full lines.

The declutching device is so constructed that the lug 46 then lies beyond the angle element 48, and more precisely beyond the arm 51 of the latter, as indicated in FIG. 3A. This removes the constraint provided by the angle element 48 against circumferential movement of the movable member 24, which accordingly automatically reverts to its rotational rest position with respect to the fixed member 23 due to the precompression of the torsion spring 34. This causes the lug 46 of the retaining means 33 to move angularly passed the angle element 48, as indicated by the arrow F1 in FIG. 3B. The lug 46 is now no longer axially in line with the angle element 48. FIG. 3B shows, in phantom lines as before, the initial position of the lug 46 at the beginning of this rotational unwinding movement of the movable member 24, with its final position at the end of this movement being shown in full lines.

The movable member of the hydraulic actuator 11 is now free for both circumferential and axial movement, while remaining in hooked relationship on the coupling member 20. There may now be some axial retracting movement of the movable member 24 into the fixed member 23, as indicated by the arrow F3 in FIG. 3C in respect of one single lug 46 of the retaining means 33, once the two units 16P and 16S are no longer subject to relative axial displacement away from each other. This retracting movement (i.e. movement of the member 24 to the right in FIG. 1) may for example be due to the biassing effect of the preloading means 32, or the pressure resulting from an injection of hydraulic fluid into the control chamber 26. Again, FIG. 3C shows in phantom lines the initial position of the lug 46 at the beginning of such an axial retracting movement, while its final position at the end of this movement is shown in full lines.

It will be appreciated that, in order to obtain the correct snap-fitted configuration, there is no need to exert any axial force apart from that which is necessary to engage the coupling member 20 on the actuating element 30 of the clutch release bearing 28; and that the snap-fitting action takes place systematically without any other action at all being necessary. It will also be appreciated that the declutching device, and the method of assembling it to the clutch described above, enables a clear and very simple positive check to be made that correct snap-fitting has in fact taken place.

Finally, it will be realized that if necessary, the declutching device 10 can be re-armed. For this purpose, all that is required is that the lug 46 of the retaining means 32 should be moved back into engagement with the angle element 48 associated with it.

The present invention is of course not limited to the embodiment described above and shown in the drawings, but embraces all possible variants. In particular, the retaining means employed may include several lugs, spaced apart from each other circumferentially about the axis of the control chamber, with an equivalent number of angle elements also being provided, with one angle element to each lug.

In addition, and as disclosed in French patent specification FR 2 304 826A, all embodiments of which may be used in the present case, the coupling member may be carried by the actuating element of the clutch release bearing, instead of being part of the thrust means of the clutch.

What is claimed is:

1. A declutching device for a clutch of the pull-off type, for snap-fitted coupling with such a clutch, the declutching device comprising an hydraulic actuator which itself comprises: a movable member; a fixed member mounting the said movable member for sliding movement of latter with respect to the said fixed member in piston and cylinder relationship with said fixed member, between an extended position and a retracted position of said movable member with respect to said fixed member; a preloading coil spring operatively interposed between said fixed and movable members for biassing said movable member permanently towards its said retracted position; and retaining means operatively interposed between said fixed and movable members for retaining said movable member in its said extended position, wherein said fixed and movable members include means engaging respective ends of said spring so as to index each said end angularly to the corresponding said member of the actuator, said retaining means comprising at least one lug fixed with respect to one of said fixed and movable members, and an angle element fixed with respect to the other said member of the actuator and cooperating with a respective said lug whereby to provide axial and circumferential abutment between said actuating members in a predetermined relative angular position of the latter, so as to put said spring under torsional prestress.

2. The declutching device according to claim 1, further including a first annular cup located on said fixed member and a second annular cup located on said movable member, each said cup having a base, said spring bearing at its respective ends on said bases, with said lug at least one being integral with one said cup and said at least one angle element being integral with the other said cup.

3. The declutching device according to claim 2, wherein said at least one lug is integral with the first annular cup and said at least one angle element is integral with the second annular cup.

4. The declutching device according to claim 2, wherein the annular cup having the angle element is formed with at least one pressed-out slot partly bounded by said angle element projecting from the cup.

* * * * *